3 Sheets--Sheet 1.

H. LAW.

Paper-Cutting Machines.

No. 5,503. Reissued July 29, 1873.

Witnesses.

Thos. G. Douglas

Geo. W. Read

Inventor

Henry Law

AM. PHOTO-LITHOGRAPHIC CO. N.Y. (OSBORNE'S PROCESS.)

3 Sheets--Sheet 2.

H. LAW.

Paper-Cutting Machines.

No. 5,503. Reissued July 29, 1873.

Witnesses

Thos H Douglas

Geo W Reed

Inventor

Henry Law

AM. PHOTO-LITHOGRAPHIC CO. N.Y. (OSBORNE'S PROCESS)

3 Sheets--Sheet 3.

H. LAW.

Paper-Cutting Machines.

No. 5,503. Reissued July 29, 1873.

*Witnesses*

Thos L Douglas

Geo W Reed

*Inventor*

Henry Law

A.M. PHOTO-LITHOGRAPHIC CO. N.Y. (OSBORNE'S PROCESS.)

UNITED STATES PATENT OFFICE.

HERVEY LAW, OF CHATHAM, NEW JERSEY.

IMPROVEMENT IN PAPER-CUTTING MACHINES.

Specification forming part of Letters Patent No. 42,200, dated April 5, 1864; reissue No. 5,503, dated July 29, 1873; application filed February 3, 1873.

*To all whom it may concern:*

Be it known that I, HERVEY LAW, of Chatham, in the county of Morris and State of New Jersey, have invented a new and Improved Machine for Cutting Paper designed for the use of book-binders, paper-box makers, and others; and I do hereby declare that the following is a full, clear, and exact description of the same, reference being had to the accompanying drawings making a part of this specification, in which—

Figure 1:
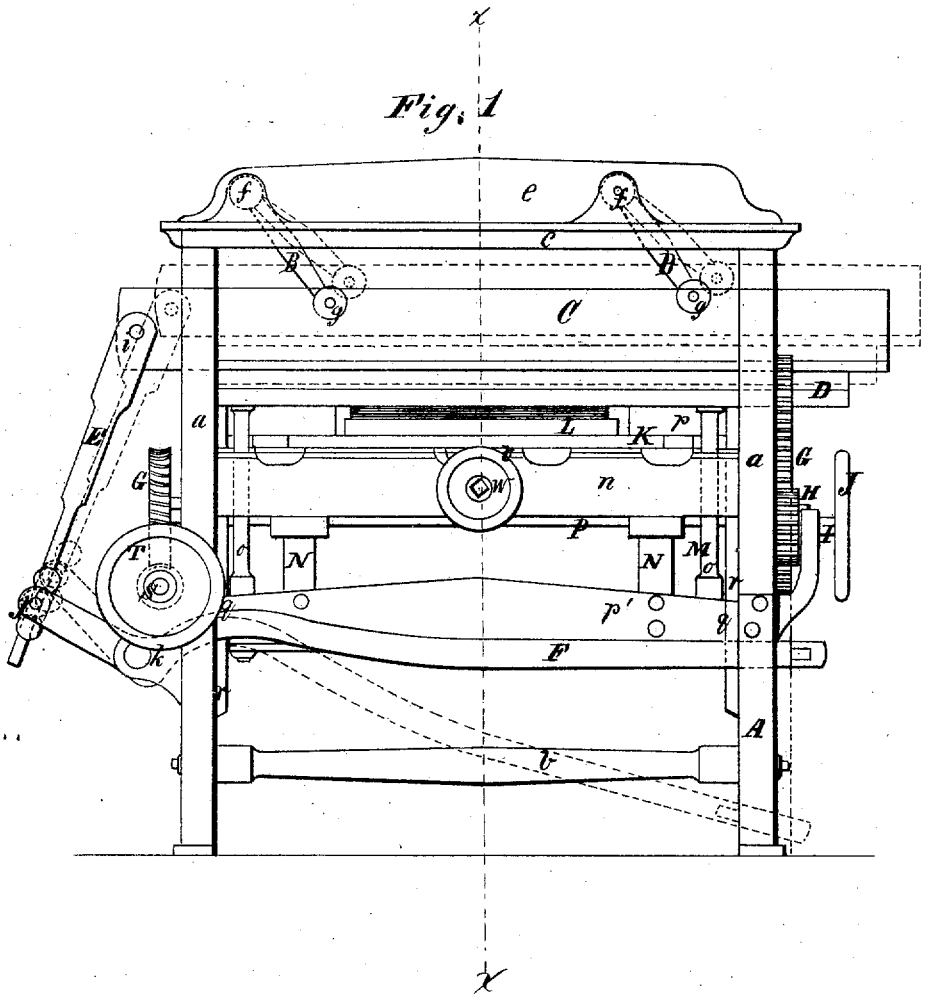
Figure 2:
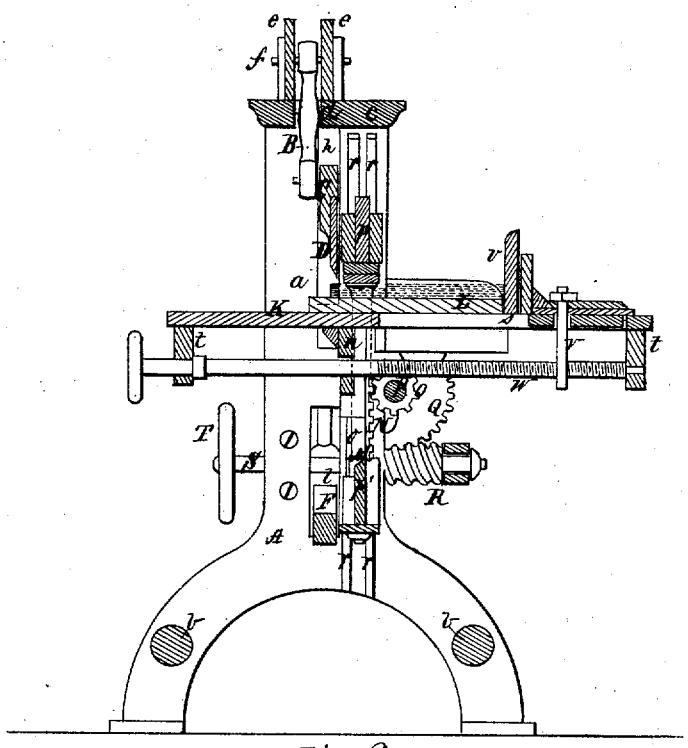
Figure 3:
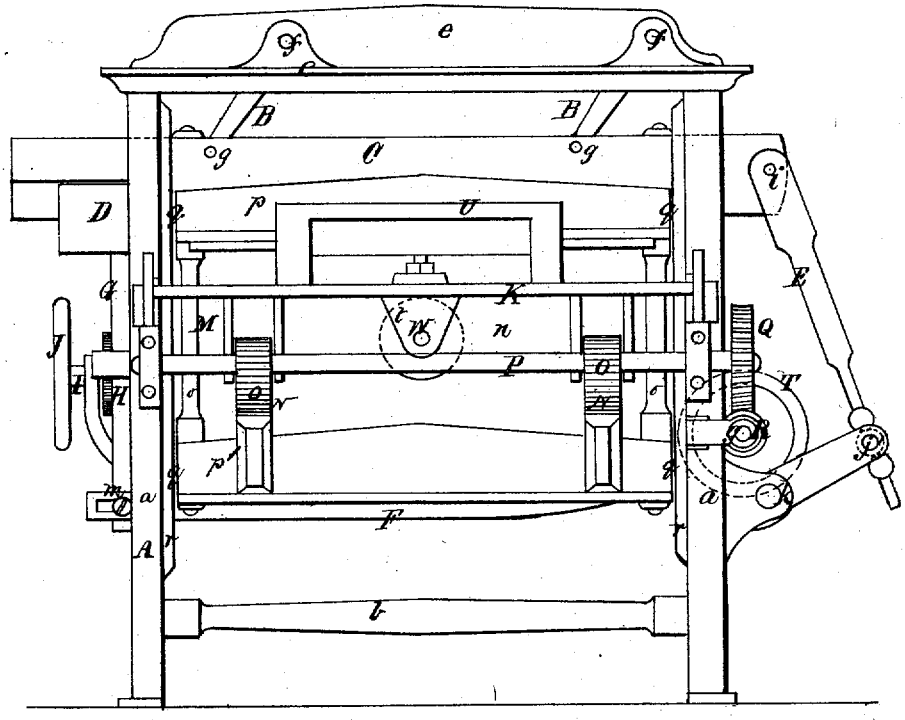

Figure 1 is a front elevation of my invention; Fig. 2, a transverse vertical section of the same taken in the line *x x*, Fig. 1; Fig. 3, a back elevation of the same.

Similar letters of reference indicate corresponding parts in the several figures.

To enable those skilled in the art to fully understand and construct my invention, I will proceed to describe it.

A represents the frame of the machine, which may be of cast-iron, and composed of two uprights, *a a*, connected, near their lower ends, by cross-rods *b*, and connected at their upper ends by a cross-plate, *c*, having a slot, *d*, made longitudinally in it, with an upright flange, *e*, at each side. B B are two parallel arms or bars, the upper ends of which are secured by pivots *f f* between the flanges *e e*, the arms or bars passing through the slot *d*, and attached at their lower ends, by pivots *g g*, to a horizontal bar, C, the ends of which work through vertical slots *h h* in the uprights *a a*. To this bar C the knife D is attached, the latter projecting down a suitable distance below the bar C. To one end of the bar C a rod, E, is connected by a pivot or bolt, *i*, the lower end of said rod passing through and being connected with a small oscillating shaft, *j*, at one end of lever F, which lever has its fulcrum at *k* and passes through slots *l l* in the uprights *a a*. The opposite end of this lever F is connected by a pin, *m*, which passes through a longitudinal oblong slot in the lever to an upright rack, G, into which a pinion, H, on a driving-shaft, I, gears. On the driving-shaft I there is placed a driving-pulley, J, which, in practice, is placed loosely on shaft I, and is connected to and disconnected from it by means of a clutch arranged in any proper manner. K is a horizontal bed firmly secured to a cross-bar, *n*, between the two uprights *a a*. On this bed K there is placed a block, L, on which the paper to be cut, shown in dotted lines, is laid. M is a rectangular upright frame placed in the frame A, and composed of two upright rods, *o o*, connected, at their upper and lower ends, by horizontal bars *p p′*, the ends of which have tenons *q* formed on them to work between guides *r* at the inner side of the uprights *a a*. The lower bar *p′* of the frame M has two vertical racks, N N, attached to it, into which pinions O O on a shaft, P, gear, one end of said shaft having a worm-wheel, Q, upon it, which gears into a screw, R, on a shaft, S, the latter being at one side of the frame A, and having a hand-wheel, T, at its front end. By turning this shaft S the frame M may be raised and lowered and the under edge of the upper bar *p* brought in contact with the paper on block L, or raised up free from it when desired. The upper bar *p* works by the side of the knife D, and the latter, it will be seen, will be drawn down to act upon and cut the paper, when the shaft I is turned in the proper direction to admit of the pinion H raising the rack G and operating the lever F. Thus I obtain a powerful mechanism for operating the knife within quite a limited compass. When the rack G is run up to the extent of its movement and the knife D has completed its cut the pulley J is disconnected from the shaft I, and the rack G and the attached end of the lever F drop by their own gravity, and the knife D rises to its upward position ready for a succeeding downward stroke. The paper is adjusted properly underneath the knife D by means of a gage, U, which is an upright plate placed on the bed K, and having a pendent nut, V, attached, which passes through a slot, *s*, in the bed K. This nut V has a screw, W, passing through it, said screw being fitted in bearings *t* attached to the under side of the bed K. By turning the screw W the gage U may be moved forward or backward to the desired spot to admit of the paper being placed against it to bring the paper properly under the knife or at the points where the cut should be made. The gage U, it will be seen, as well as the clamp-bar *p* of the frame M, may be adjusted by the operator from the front side of the machine. The bar *p* is brought down upon the paper previous to each cut of the knife D, and the gage V is adjusted from time to time to suit the size of the sheets of paper to be cut or trimmed.

Having thus described my invention, what I claim as new, and desire to secure by Letters Patent, is—

1. The combination of the lever F with the knife and rack and pinion, substantially in the manner and for the purpose herein shown and described, or its equivalent, constructed and operated substantially as described.

2. The arrangement of the knife-stock above the table and the actuating-lever beneath the table, the latter being hung to the knife-stock at one end by a rod and to actuating mechanism at its opposite end, both connections being outside of the frame of the machine, substantially as described.

HERVEY LAW.

Witnesses:
ALFRED SHEDLOCK,
WILLIAM SHEDLOCK.